United States Patent
Chennupaty et al.

(10) Patent No.: US 7,155,601 B2
(45) Date of Patent: Dec. 26, 2006

(54) MULTI-ELEMENT OPERAND SUB-PORTION SHUFFLE INSTRUCTION EXECUTION

(75) Inventors: Srinivas Chennupaty, Portland, OR (US); Carlos A. Fuentes, Jr., Portland, OR (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 09/783,779

(22) Filed: Feb. 14, 2001

(65) Prior Publication Data

US 2002/0112147 A1 Aug. 15, 2002

(51) Int. Cl.
*G06F 9/315* (2006.01)

(52) U.S. Cl. ........................ 712/300; 712/22
(58) Field of Classification Search .............. 712/4, 712/225, 300, 22
See application file for complete search history.

(56) References Cited

U.S. PATENT DOCUMENTS

| | | | |
|---|---|---|---|
| 3,711,692 A | 1/1973 | Batcher | 708/210 |
| 3,723,715 A | 3/1973 | Chen et al. | 708/709 |
| 4,139,899 A | 2/1979 | Tulpule et al. | 712/224 |
| 4,161,784 A | 7/1979 | Cushing et al. | 708/513 |
| 4,393,468 A | 7/1983 | New | 708/518 |
| 4,418,383 A | 11/1983 | Doyle et al. | 710/307 |
| 4,490,786 A * | 12/1984 | Nakatani | 712/5 |
| 4,498,177 A | 2/1985 | Larson | 714/806 |
| 4,707,800 A | 11/1987 | Montrone et al. | 708/714 |
| 4,771,379 A | 9/1988 | Ando et al. | 712/42 |
| 4,903,228 A | 2/1990 | Gregoire et al. | 712/224 |
| 4,989,168 A | 1/1991 | Kuroda et al. | 708/210 |
| 5,081,698 A | 1/1992 | Kohn | 345/422 |
| 5,095,457 A | 3/1992 | Jeong | 708/626 |
| 5,168,571 A | 12/1992 | Hoover et al. | 712/210 |
| 5,187,679 A | 2/1993 | Vassiliadis et al. | 708/706 |
| 5,268,995 A | 12/1993 | Diefendorff et al. | 345/422 |
| 5,390,135 A | 2/1995 | Lee et al. | 708/518 |
| 5,408,670 A | 4/1995 | Davies | 712/16 |
| 5,423,010 A | 6/1995 | Mizukami | 341/60 |
| 5,426,783 A | 6/1995 | Norrie et al. | 712/225 |
| 5,465,374 A | 11/1995 | Dinkjian et al. | 711/219 |
| 5,487,159 A | 1/1996 | Byers et al. | 712/223 |
| 5,524,256 A * | 6/1996 | Turkowski | 712/300 |
| 5,579,253 A | 11/1996 | Lee et al. | 708/625 |
| 5,594,437 A | 1/1997 | O'Malley | 341/67 |
| 5,625,374 A | 4/1997 | Turkowski | 345/639 |
| 5,680,161 A | 10/1997 | Lehman et al. | 345/531 |

(Continued)

FOREIGN PATENT DOCUMENTS

WO  WO 97/07450 A1  2/1997

(Continued)

OTHER PUBLICATIONS

Intel Corporation, "Intel Architecture Software Developer's Manual, vol. 2: Instruction Set Reference", 1999.

(Continued)

*Primary Examiner*—Kenneth S. Kim
(74) *Attorney, Agent, or Firm*—Larry M. Mennemeier

(57) ABSTRACT

An apparatus and method for performing a shuffle operation on packed data is described. In one embodiment, a 128-bit packed data operand having at eight data elements is accessed. In one embodiment, one of the data elements in the upper half of the data operand is shuffled into the upper half of a destination register. In another embodiment, one of the data elements in the lower half of the data operand is shuffled into the lower half of a destination register.

30 Claims, 8 Drawing Sheets

U.S. PATENT DOCUMENTS

| | | | | |
|---|---|---|---|---|
| 5,781,457 | A | | 7/1998 | Cohen et al. ............... 708/231 |
| 5,819,117 | A | * | 10/1998 | Hansen ....................... 712/300 |
| 5,822,619 | A | * | 10/1998 | Sidwell ...................... 712/300 |
| 5,838,984 | A | * | 11/1998 | Nguyen et al. ................. 712/5 |
| 5,909,572 | A | | 6/1999 | Thayer et al. .............. 712/226 |
| 5,933,650 | A | * | 8/1999 | van Hook et al. .............. 712/2 |
| 6,041,404 | A | | 3/2000 | Roussel et al. |
| 6,115,812 | A | | 9/2000 | Abdallah et al. |
| 6,192,467 | B1 | * | 2/2001 | Abdallah et al. ........... 712/222 |
| 6,288,723 | B1 | * | 9/2001 | Huff et al. .................. 345/644 |
| 6,484,255 | B1 | * | 11/2002 | Dulong ....................... 712/224 |
| 6,546,480 | B1 | * | 4/2003 | Mandavilli et al. ......... 712/222 |

FOREIGN PATENT DOCUMENTS

| | | |
|---|---|---|
| WO | WO 97/0967 A1 | 3/1997 |
| WO | WO 97/32278 A1 | 9/1997 |

OTHER PUBLICATIONS

Intel Corporation, "Willamette Processor Software Developer's Guide", manual, Feb. 2000.

European Search Report, EP 99 30 2378, Mar. 14, 2000, 3 pages.

Austrian Search Report, Appln. No. 9901342-7, Oct. 31, 2000, 7 pages.

TRI-MEDIA, "TM1000 Preliminary Data Book," Phillips Electronics No. Amer., 1997, 30 pages.

Silicon Graphics, "Silicon Graphics Introduces Compact MIPS® RISC Microprocessor Code for High Performance at a Low Cost," Oct. 21, 1996, 13 pages.

"MIPS Digital Media Extension," *Set Architecture Specification*, Web Site mips.com/MDMXspec.ps (Oct. 21, 1997), 8 pages.

Hewlet Packard, "64-bit and Multimedia Extensions in the PA-RISC 2.0 Architecture," Microprocessors Precision Architecture, 1997, 18 pages.

Sun Microsystems, ULTRASPARC™ The Visual Instruction Set (VIS™): On Chip Support for New-Media Processing, Whitepaper 95-022, 1996, 7 pages.

Kawakami, Y., et al., "A Single-Chip Digital Signal Processor for Voiceband Applications," IEEE, 1980 International Solid-State Circuits Conference, pp. 40-41.

UltraSPARC Multimedia Capabilities On-Chip Support for Real0-Time Video and Advanced Graphics; SPARC Technology Business, Sep. 1994, Sun Microsystems, Inc.

Case, B., "Philips Hopes to Displace DSPs with VLIW, TriMedia Processors Aimed at Future Multimedia Embedded Apps," Microprocessor Report, Dec. 1994, pp. 12-18.

Gwennap, L., "New PA-RISC Processor Decodes MPEG Video, H"'s PA-7100LC Uses New Instructions to Eliminate Decoder Chip, Microprocessor Report, Jan. 1994, pp. 16-17.

TMS320c2X, User's Guide, Digital Signal Processing Products, Texas Instruments, 1993, pp. 3-2-3-11; 3-28-3-34; 4-1-4-22; 4-41; 4-103; 4-119; 4-120; 4-122; 4-150; 4-151.

i860 TM. Microprocessor Family Programmer's Reference Manual, Intel Corporation, 1992, Chapters 1, 3, 8, and 12.

Lee, R.B., "Accelerating Multimedia with Enhanced Microprocessors," IEEE Micro, Apr. 1995, pp. 22-32.

Pentium Processor's User's Manual, vol. 3: Architecture and Programming Manual, Intel Corporation, 1993, Chapters 1, 3, 4, 6, 8, and 18.

Margulis, N., "i860 Microprocessor Architecture," McGraw Hill, Inc., 1990, Chapters 6, 7, 8, 10, and 11.

Intel i750, i860 TM, i960 Processors and Related Products, 1993, pp. 1-3.

Motorola MC88110 Second Generation RISC Microprocessor User's Manual, Motorola, Inc., 1991.

MC88110 Second Generation-RISC Microprocessor User's Manual, Motorola, Inc., Sep. 1992, pp. 2-1 through 2-22, 3-1 through 3-32, 5-1 through 5-25, 10-62 through 10-71, Index 1 through 17.

Errata to MC88110 Second Generation RISC Microprocessor User's Manual, Motorola, Inc., 1992, pp. 1-11.

MC88110 Programmer's Reference Guide, Motorola, Inc., 1992, pp. 1-4.

Shipnes, J., "Graphics Processing with the 88110 RISC Microprocessor," Motorola, Inc., IEEE, No. 0-8186-26455-0/92, 1992, pp. 169-174.

Abbott, et al., "Broadband Algorithms with the MicroUnity Mediaprocessor," MicroUnity Systems Engineering, Inc. Proceedings of Compcon, IEEE, 1996, pp. 349-354.

Advanced Micro Devices, Inc., "AMD-3D Technology Manual," Feb. 1998, pp. 1-58.

Diefendorff, K., et al., "AltiVec Extension to PowerPC Accelerates Media Processing," IEEE, #0272-1732/00, 2000, pp. 85-95.

Hansen, C., "Architecture of a Broadband Mediaprocessor," Proceedings of Compcon, IEEE, 1996, pp. 334-340.

Hayes, et al., "MicroUnity Software Development Environment," MicroUnity Systems Engineering, Inc., Proceedings of Compcon, IEEE, 1996, pp. 341-348.

Intel Corporation, "Intel Architecture Software Developer's Manual, vol. 2; Instruction Set Reference," 1999, 26 pgs.

Intel Corporation, "Willamette Processor Developer's Guide," Manual, Feb. 2000, 16 pages.

Intel Corporation, "IA-32 Intel® Architecture Software Developer's Manual, vol. I: Basic Architecture," 2002, 21 pgs. total.

Intel Corporation, "IA-32 Intel® Architecture Software Developer's Manual, vol. II: Instruction Set Reference," 2002, 19 pgs. total.

Intel Corporation, "Intel® Itanium™ Architecture Software Developer's Manual, vol. 3: Instruction Set Reference," Rev. 2.0, Dec. 2001, 30 pgs. total.

Intel Corporation, "Intel486™ Microprocessor Family Programmer's Reference Manual," 1992, 44 pgs. total.

Intel Corporation, "Pentium® Processor Family Developer's Manual, vol. 3: Architecture and Programming Manual," 1995, 54 pgs. total.

Intel Corporation, "Pentium® Processor User's Manual, vol. 3: Architecture and Programming Manual," 1993, 50 pgs. total.

Levinthal, et al., "Chap—A SIMD Graphics Processor," Computer Graphics Project, ACM, vol. 18, No. 3, Jul. 1984, pp. 77-81.

Levinthal, et al., "Parallel Computers for Graphics Applications," Proceedings: Second Int'l Conf. on Architectural Support for Programming Languages and Operating Systems, (ASPLOS II), IEEE, 1987, pp. 193-198.

Wang, et al., "A Processor Architecture for 3D Graphics Calculations," Computer Motion, Inc., Goleta, CA, 23 pgs.

\* cited by examiner

MULTI-ELEMENT OPERAND SUB-PORTION SHUFFLE INSTRUCTION EXECUTION

FIELD OF THE INVENTION

The invention relates to computer systems, and in particular, to an apparatus and method for performing multi-dimensional computations using a shuffle operation.

BACKGROUND

A Single Instruction, Multiple Data (SIMD) architecture improves efficiency of multi-dimensional computations. Implemented in computer systems, the SIMD architecture enables one instruction to operate on data simultaneously, rather than on a single data. In particular, SIMD architectures take advantage of packing many data elements within one register or memory location. With parallel hardware execution, multiple operations can be performed with one instruction, resulting in significant performance improvement.

Although many applications currently in use can take advantage of such operations, known as vertical operations, there are a number of important applications which require the rearrangement of the data elements before vertical operations can be implemented so as to provide realization of the application. Examples of some important applications include the dot product and matrix multiplication operations, which are commonly used in 3-D graphics and signal processing applications.

One problem with rearranging the order of data elements within a register or memory word is the mechanism used to indicate how the data should be rearranged. Typically, a mask or control word is used. The control word must include enough bits to indicate which of the source data fields must be moved into each destination data field. For example, if a source operand has eight data fields, requiring three bits to designate any given data field, and the destination register has four data fields, (3×4) or 12 bits are required for the control word. However, on a processor implementation where there are less than 12 bits available for the control register, a full shuffle cannot be supported.

Therefore, there is a need for a way to reorganize the order of data elements where less than the full number of bits is available for a control register.

BRIEF DESCRIPTION OF THE DRAWINGS

The invention will be described in detail with reference to the following drawings in which like reference numerals refer to like elements wherein.

DETAILED DESCRIPTION

In the following description, numerous specific details are set forth to provide a thorough understanding of the invention. However, it will be understood by one of ordinary skill in the art that the invention may be practiced without these specific details. In other instances, well-known circuits, structures and techniques have not been shown in detail in order not to obscure the invention.

One embodiment of the invention provides a way to reorganize the order of data elements where less than the full number of bits is available for a control register. Herein, a method and apparatus are described for moving data elements in a packed data operand (a shuffle operation). The shuffle operation allows shuffling of certain-sized data, including 128-bit data, from a source register into a destination register. The destination register may be the same as a source register. The shuffle instruction is useful in data reorganization and in moving data into different locations of the register to allow, for example, extra storage for scalar operations, or to facilitate conversion between data formats such as from packed integer to packed floating point and vice versa.

The term "registers" is used herein to refer the on-board processor storage locations that are used as part of macro-instructions to identify operands. In other words, the registers referred to herein are those that are visible from the outside of the processor (from a programmers perspective). The registers described herein can be implemented by circuitry within a processor using any number of different techniques, such as dedicated physical registers, dynamically allocated physical registers using register renaming, combinations of dedicated and dynamically allocated physical registers, and the like. Registers may also be emulated using general or special purpose storage locations. However, all these register techniques provide a "register" in that an instruction which accesses a register is given an acceptable storage location. The term "computer readable medium" includes, but is not limited to portable or fixed storage devices, optical storage devices, and any other memory devices capable of storing computer instructions and/or data. Here, "computer instructions" are software or firmware including data, codes, and programs that can be read and/or executed to perform certain functions. Also, the term "upper half" refers to the first half of an operand or register and contains the "high data elements." Similarly, "lower half" refers to the second half of an operand or register and contains the "low data elements."

Figure 1:
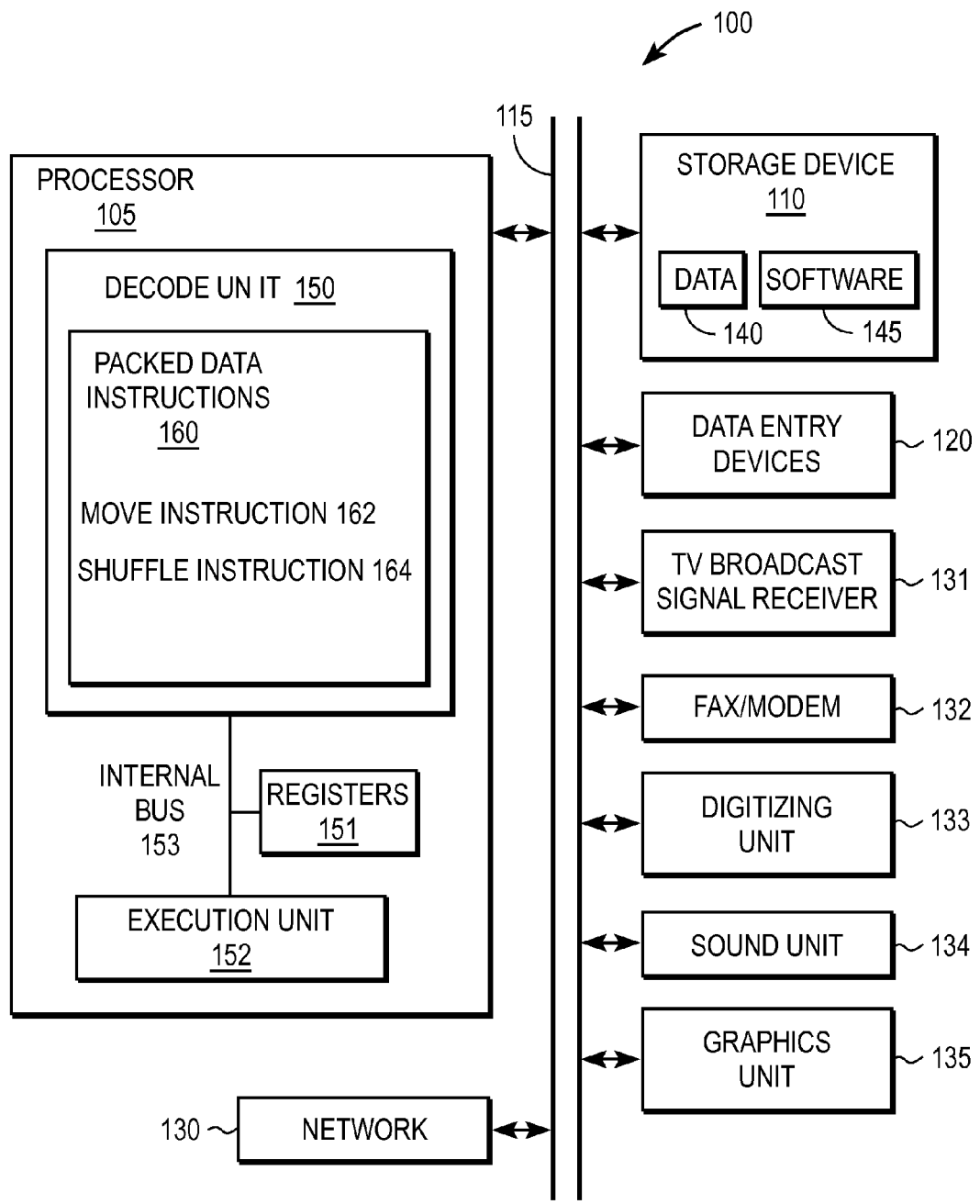
FIG. 1 illustrates an exemplary computer system in accordance with one embodiment of the invention.

FIG. 1 illustrates one of many embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices 120, such as a keyboard, mouse and display, are also coupled to the bus 115.

The processor 105 represents a central processing unit of any type of architecture, such as Complex Instruction Set Computer (CISC), Reduced Instruction Set Computer (RISC), very long instruction word (VLIW), or a hybrid architecture (e.g., a combination of hardware and software translation). Also, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., Accelerated Graphics Port "AGP", Peripheral Component Interconnect "PCI", Industry Standard Architecture "ISA", Extended Industry Standard Architecture "EISA", Video Electronics Standard Architecture "VESA" and the like) and bridges (also termed as bus controllers). While this embodiment is described in relation to a single processor computer system, the invention could be implemented in a multi-processor computer system. In addition, while this embodiment is described in relation to a 128-bit computer system, the invention is not limited to a 128-bit computer system.

Furthermore, devices including but not limited to one or more of a network 130, a TV broadcast signal receiver 131, a fax/modem 132, a digitizing unit 133, a sound unit 134, and a graphics unit 135 may optionally be coupled to bus 115. The network 130 represents one or more network connections (e.g., an Ethernet connection). The TV broadcast signal receiver 131 represents a device for receiving TV broadcast signals, the fax/modem 132 represents a fax and/or modem for receiving and/or transmitting analog signals. The digitizing unit 133 represents one or more devices for digitizing images (e.g., a scanner, camera, etc.). The sound unit 134 represents one or more devices for inputting and/or outputting sound (e.g., sound card, microphones, speakers, magnetic storage devices, optical storage devices, etc.). The graphics unit 135 represents one or more devices for generating images (e.g., graphics card).

FIG. 1 also illustrates that the storage device 110 has stored therein data 140 and software 145. Data 140 represents data stored in one or more of the formats described herein. Software 145 represents the necessary code for performing any and/or all of the techniques in accordance with the present invention. It will be recognized by one of ordinary skill in the art that the storage device 110 may contain additional software (not shown), which is not necessary to understanding the invention.

FIG. 1 additionally illustrates that the processor 105 includes decode unit 150, a set of registers 151, execution unit 152, and an internal bus 153 for executing instructions. It will be recognized by one of ordinary skill in the art that the processor 105 contains additional circuitry, which is not necessary to understanding the invention. The decode unit 150, registers 151 and execution unit 152 are coupled together by internal bus 153. The decode unit 150 is used for decoding instructions received by processor 105 into control signals and/or microcode entry points. In response to these control signals and/or microcode entry points, the execution unit 152 performs the appropriate operations. The decode unit 150 may be implemented using any number of different mechanisms (e.g., a look-up table, a hardware implementation, a programmable logic array "PLA"). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 150 is shown including a packed data instruction set 160 for performing operations on packed data. In one possible embodiment, the packed data instruction set 160 includes the following instructions: a move instruction(s) 162 and a shuffle instruction(s) 164. The number format for the instructions can be any formant including signed and unsigned integers, floating-point numbers, and non-numeric data. The operation of these instructions is described herein. While one embodiment is described in which the packed data instructions operate on integer data, alternative embodiments may contain different formats and still utilize the teachings of the invention.

In addition to the packed data instructions, processor 105 can include new instructions and/or instructions similar to or the same as those found in existing general purpose processors. For example, in one embodiment, the processor 105 supports an instruction set which is compatible with the Intel® Architecture instruction set used in the Pentium® IV processor. Alternative embodiments of the invention may contain more or less, as well as different, packed data instructions and still utilize the teachings of the invention.

The registers 151 represent a storage area on processor 105 for storing information, including control/status information, integer data, floating point data, and packed data. It will be understood by one of ordinary skill in the art that one aspect of the invention is the described instruction set for operating on packed data as well as how the instructions are used. According to these aspects of the invention, the storage area used for storing the packed data is not critical. The term data processing system is used herein to refer to any machine for processing data, including the computer systems(s) described with reference to FIG. 1.

While one embodiment of the invention is described in which the processor 105, executing the packed data instructions operates on 128-bit packed data operands containing eight 16-bit packed data elements called "words," the processor 105 can operate on packed data in several different packed data formats. For example, in one embodiment, packed data can be operated on a "byte" format or a "double word" (dword) format. The packed byte format includes sixteen separate 8-bit data elements and the packed dword format includes four separate 32-bit data elements. While certain instructions are discussed below with reference to integer data, the instructions may be similarly applied the other packed data formats.

Figure 2:
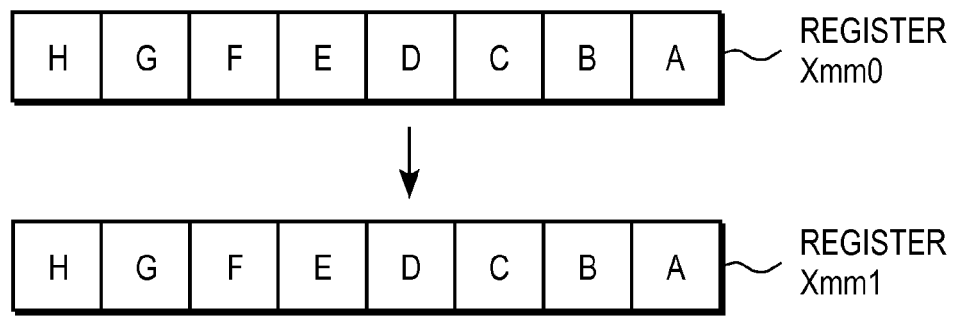
FIG. 2 illustrates the operation of the move instruction in accordance with one embodiment of the invention.

The shuffle instruction is part of a family of many different instructions which operate with Single Instruction, Multiple Data (SIMD) architecture. For example, FIG. 2 illustrates the operation of the move instruction 162 according to one embodiment of the invention. In this example, the move instruction 162 moves bits of data from one register xmm0 to another register xmm1 or from one memory location to another. In one embodiment, 128-bits representing eight packed words are moved from one memory location to another or from one register to another.

Figure 3A:
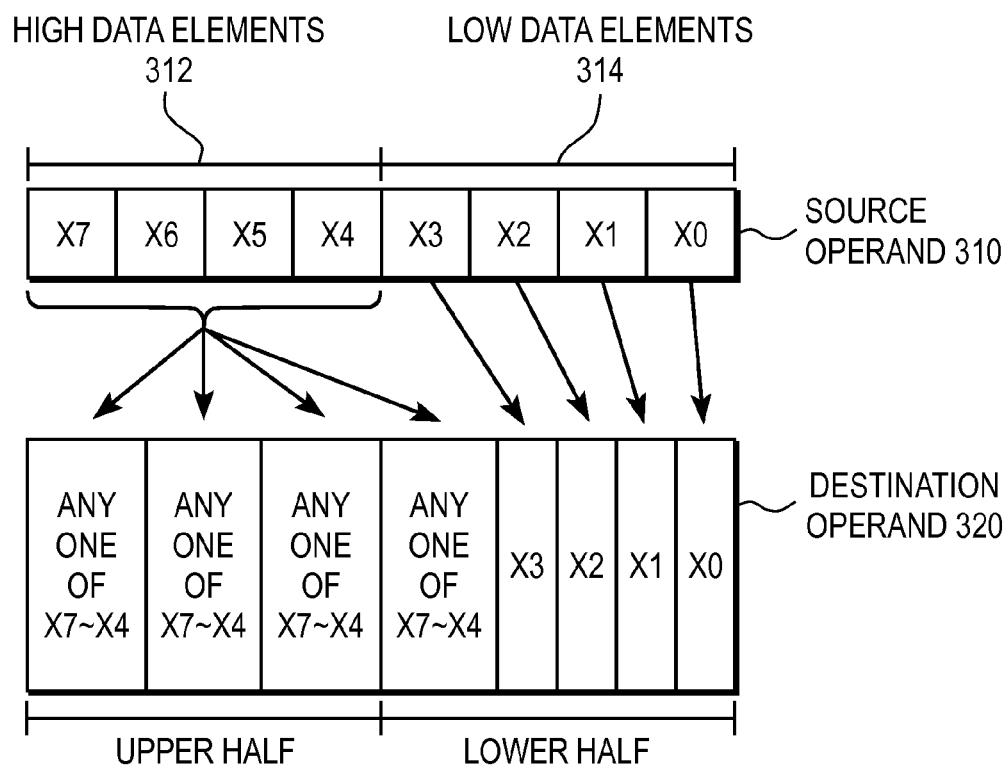
FIGS. 3A to 3C illustrate the shuffle instructions in accordance with the embodiments of the invention.

FIG. 3A illustrates a shuffle instruction 164 according to one embodiment of the invention. In this embodiment, the shuffle instruction 164 is able to shuffle any one of the high data elements 312 {X7~X4} from the source operand 310 to the upper half 322 of the destination operand 320. For example, in a given 128-bit packed data with eight 16-bit words, a shuffle instruction PSHUFHW shuffles the high words from a source operand into the upper half of a destination operand.

Figure 3B:
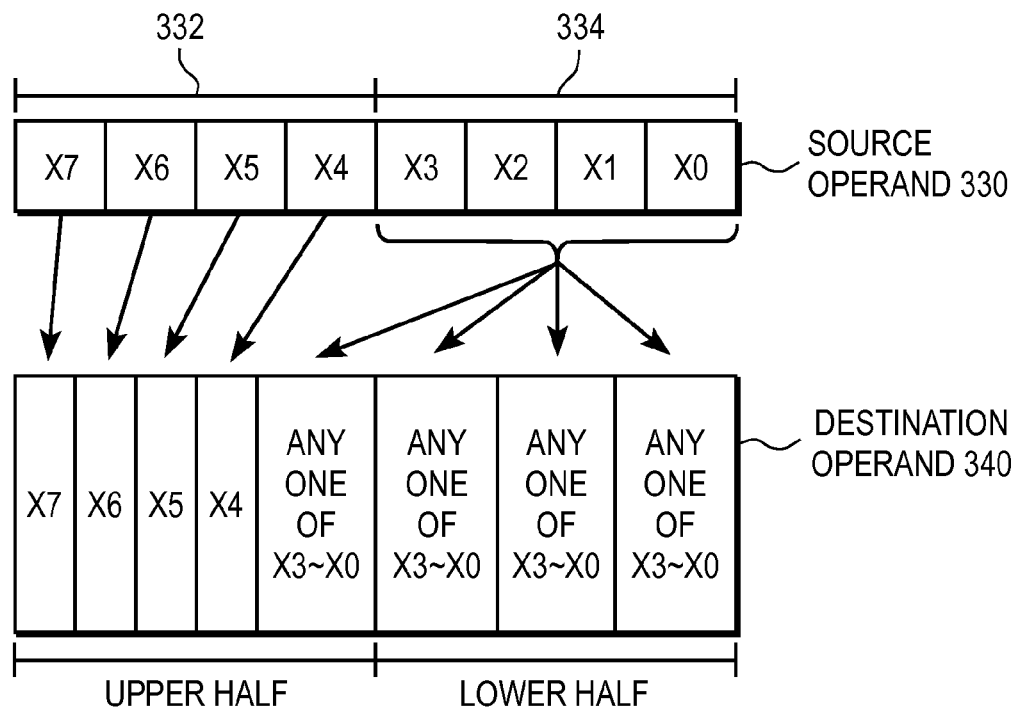

FIG. 3B illustrates a shuffle instruction 164 according to another embodiment of the invention. In this embodiment, the shuffle instruction 164 is able to shuffle any one of the low data elements 332 {X3~X0} from the source operand 330 to the lower half of the destination operand 340. For example, in a given 128-bit packed source data operand with eight 16-bit words, a shuffle instruction PSHUFLW shuffles the low words from a source operand into the lower half of a destination operand.

Figure 3C:
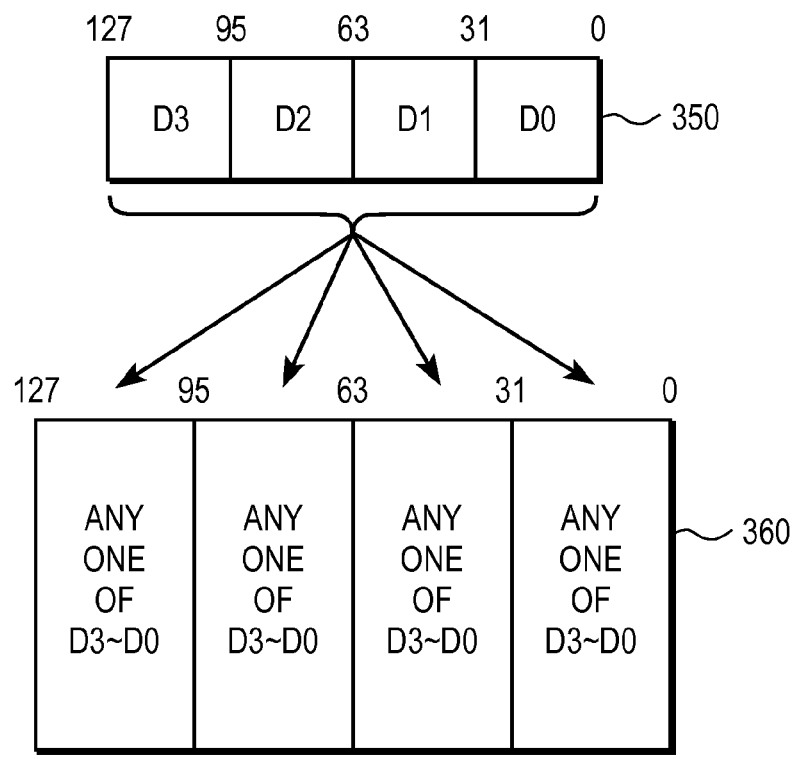

FIG. 3C illustrates a shuffle instruction 164 according to yet another embodiment of the invention. In this embodiment, a shuffle instruction PSHUFD is able to shuffle any one of the four 32-bit data elements {Y3~Y0} from a 128-bit packed source data operand 350 into a 128-bit packed destination data operand 360.

I. Shuffle Operation

Figure 4A:
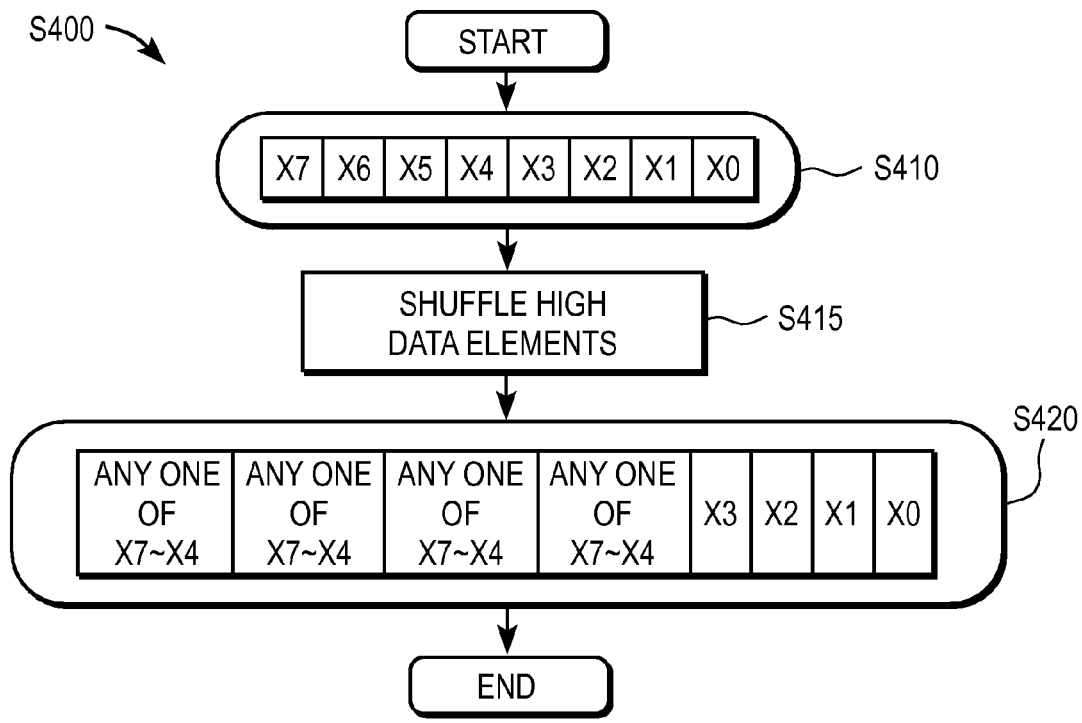
FIGS. 4A to 4C illustrate the operation of the shuffle instructions in accordance with the embodiments of the invention.

FIG. 4A illustrates a technique for performing a shuffle operation according to one embodiment of the invention. In this application, data is represented by ovals, while instructions are represented by rectangles. Beginning from a start state, the process S400 proceeds to block S410, where X0~X7 are stored as data elements in a packed data item 410. For present discussion purposes, each data element is 16-bits wide and is contained in a source register Xmm0, in the following order:

|X7|X6|X5|X4|X3|X2|X1|X0|

The process S500 then proceeds to block S415, where a shuffle instruction is performed on the contents of register Xmm0 (data item 410) to shuffle any one of the four high data elements from Xmm0 to the upper half of a destination register, Xmm1 for present discussion purposes. The resulting data item 420 is as follows:

|{X7,X6,X5,X4}|{X7,X6,X5,X4}|{X7,X6,X5,X4}|{X7,X6,X5,X4}|X3|X2|X1|X0|

Figure 4B:
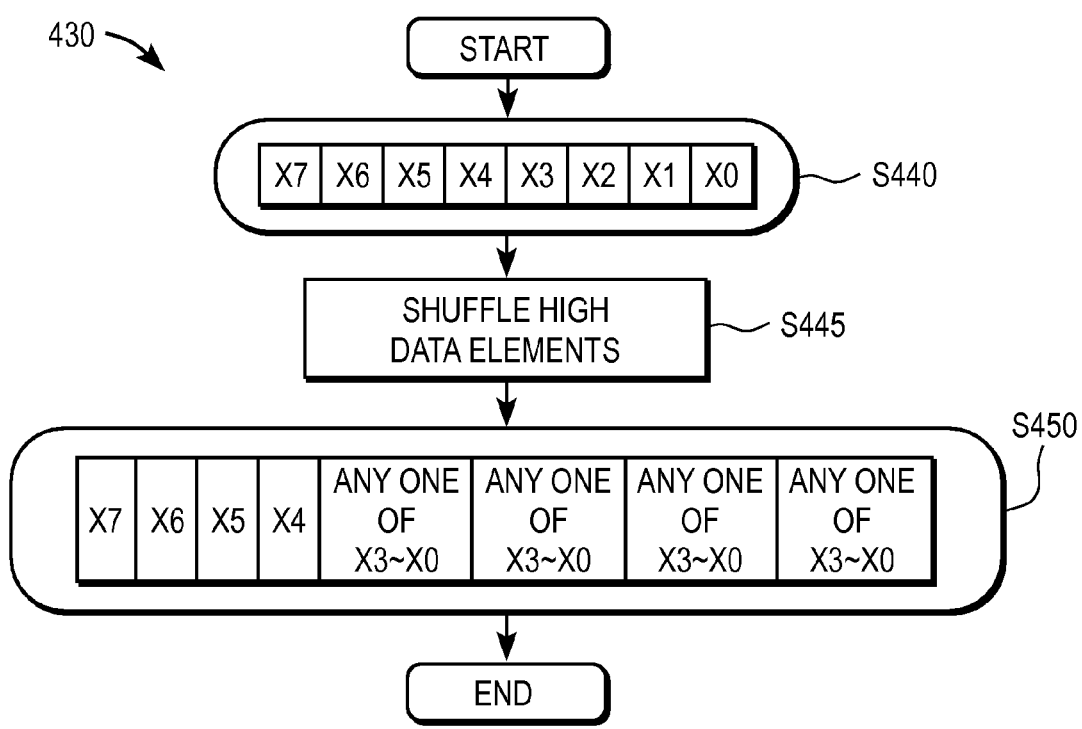

FIG. 4B illustrates another embodiment of the invention. As in FIG. 4A, data is represented by ovals, while instructions are represented by rectangles. Beginning from a start state, the process S430 proceeds to block S440, where numbers X0~X7 are stored as data elements in a packed data item 440. For present discussion purposes, each data element is 16-bits wide and is contained in source register Xmm0, in the following order:

|X7|X6|X5|X4|X3|X2|X1|X0|

The process S430 then proceeds to block S445, where a shuffle instruction is performed on the contents of register Xmm0 (data item 430) to shuffle any one of the four low data elements from Xmm0 to the lower half of a destination register, Xmm1 for present discussion purposes. The resulting data item 450 is as follows:

|X7|X6|X5|X4|{X3,X2,X1,X0}|{X3,X2,X1,X0}|{X3,X2,X1,X0}|{X3,X2,X1,X0}|

Figure 4C:
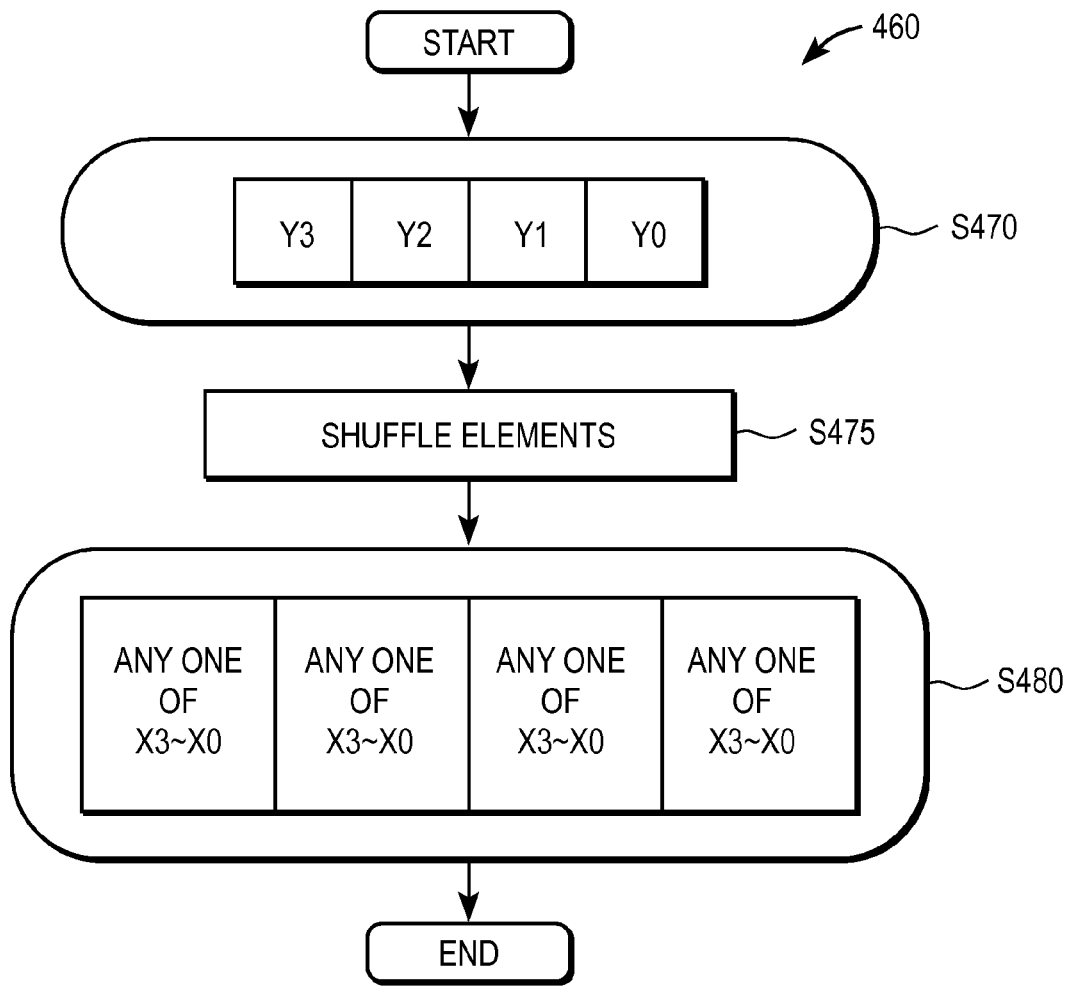

FIG. 4C illustrates another embodiment of the invention, where data is represented by ovals and instructions are represented by rectangles. Beginning from a start state, the process S460 proceeds to block S470, where Y0~Y3 are stored as data elements in a packed data item 470. For present discussion purposes, each data element is 16-bits wide and is contained in source register Xmm0, in the following order:

|Y3|Y2|Y1|Y0|

The process S460 then proceeds to block S475, where a shuffle instruction is performed on the contents of register Xmm0 (data item 470) to shuffle any one of the 16-bit data elements from Xmm0 to a destination register, Xmm1 for present discussion purposes. The resulting data item 480 is as follows:

|{Y3,Y2,Y1,Y0}|{Y3,Y2,Y1,Y0}|{Y3,Y2,Y1,Y0}|{Y3,Y2,Y1,Y0}|

Accordingly, a shuffle operation is performed. Although FIGS. 4A and 4B illustrate examples of the shuffle operation with data operands having eight data elements, the principles of the invention may also be implemented in data operands having a multiple portions of data elements. For a packed data operand having at least two portions of data elements, a portion of data elements in the $m^{th}$ position of the packed data operand is selected. A set of data elements from the portion of data elements in the $m^{th}$ location is then selected. Thereafter, each data element in the selected set of data elements is copied to specified data fields located in the corresponding portion, i.e. the $m^{th}$ location, of a destination operand. Note the multiple portions in a data operand may include equal or different number of data elements depending upon the control word. In the embodiment shown in FIGS. 4A and 4B, there are two portions, i.e. m=2, of four data elements. With an 8-bit immediate value, either the high data elements or the low data elements is selected and shuffled.

Also, in the described embodiments, the source register or operand and the destination register or operand may be the same, i.e. Xmm0=Xmm1 in FIGS. 4A~4C. Furthermore, the processes S400 and S430 can be combined. In such case, after storing X0~X7 as data elements in the packed data item, the high data elements is shuffled and then the low data elements is shuffled. Here, the low data elements can be shuffled before shuffling the high data elements.

Figure 5:
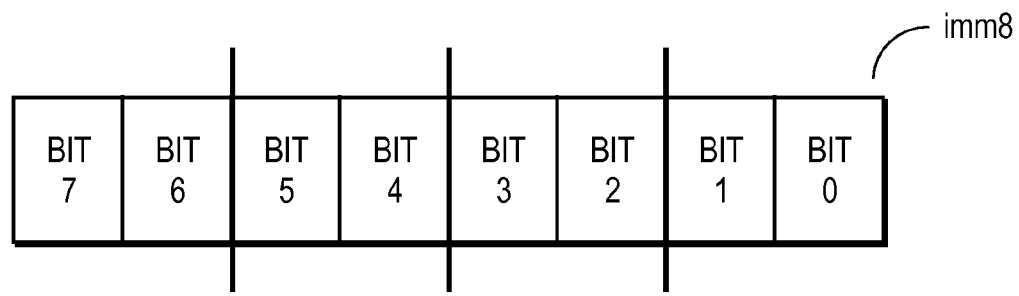
FIG. 5 illustrates an example of a control word.

An 8-bit immediate value (imm8), as shown in FIG. 5, is used as a field of control bits for the control word to indicate how data elements should be shuffled. For example, in the shuffling process of FIG. 4A, bits 0 and 1 of the control word indicate which of the four data elements in the upper half of the source register are shuffled into the first high data element location or the fifth location of the destination register. Bits 2 and 3 of the control word indicate which of the four data elements in the upper half of the source register are shuffled into the second high data element location or sixth location of the destination register. Bits 4 and 5 of the control word indicate which of the four data elements in the upper half of the source register are shuffled into the third high data element location or seventh location of the destination register. Bits 6 and 7 of the control word indicate which of the four data elements in the upper half of the source register are shuffled into the fourth high data element location or eighth location of the destination register.

Similarly, in the shuffling process of FIG. 4B, for example, bits 0 and 1 of the control word indicate which of the four data elements in the lower half of the source register are shuffled into the first low data element location or the first location of the destination register. Bits 2 and 3 of the control word indicate which of the four data elements in the lower half of the source register are shuffled into the second low data element location or second location of the destination register. Bits 4 and 5 of the control word indicate which of the four data elements in the lower half of the source register are shuffled into the third low data element location or third location of the destination register. Bits 6 and 7 of the control word indicate which of the four data elements in the lower half of the source register are shuffled into the fourth low data element location or fourth location of the destination register.

An 8-bit immediate value is also used for the shuffling process of FIG. 4C. Here, bits 0 and 1 of the control word indicate which of the four 16-bit data elements in the source register are shuffled into the first data element location of the destination register. Bits 2 and 3 of the control word indicate which of the four 16-bit data elements in the source register are shuffled into the second data element location of the destination register. Bits 4 and 5 of the control word indicate which of the four 16-bit data elements in the source register are shuffled into the third data element location of the destination register. Bits 6 and 7 of the control word indicate which of the four 16-bit data elements in the source register are shuffled into the fourth data element location of the destination register.

Specifically, given a source operand with eight data elements contained in the following order:

|H|G|F|E|D|C|B|A| and given a shuffle control word having a field of control bits 10001111 for shuffling the high data elements, the result of the shuffle is as follows:

|G|E|H|D|C|B|A|

It will be recognized by one of ordinary skill in the art that the size of the shuffle control word may vary depending without loss of compatibility with the present invention, depending on the number of data elements in the source data operand and the number of fields in the destination register.

Figure 6A:
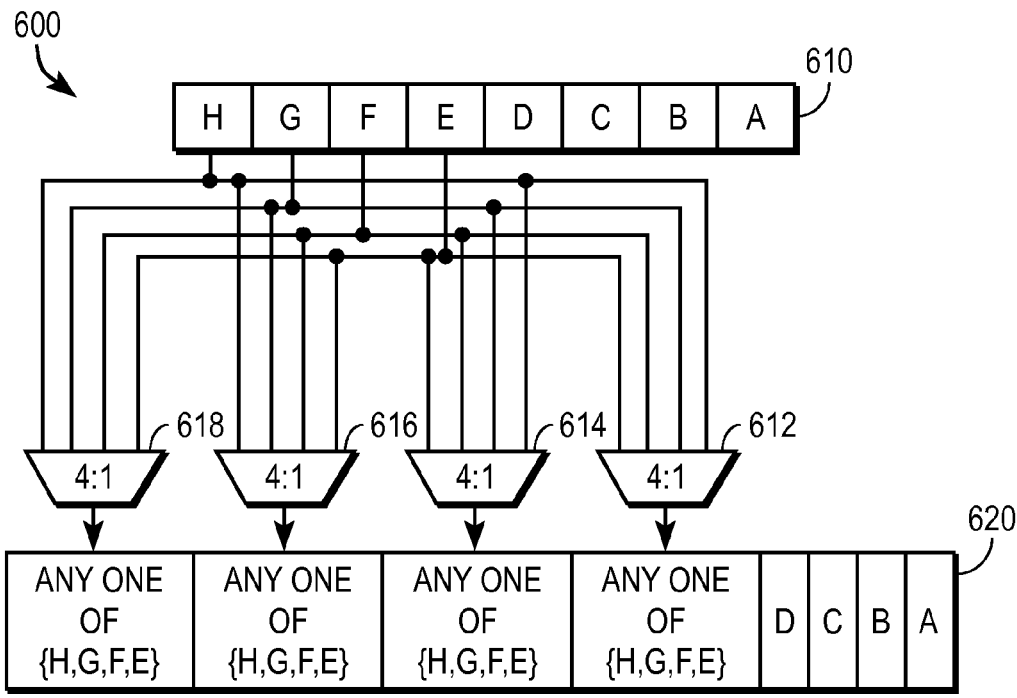
FIGS. 6A to 6C illustrate the operation of the shuffle instruction in accordance with the embodiments of the invention.

FIG. 6A illustrates a schematic for performing a shuffle operation on the high data elements according to one embodiment of the invention. The device 600 reads the contents of a source packed data operand 610. A four to one data multiplexer 612 shuffles any one of data elements {H,G,F,E} from data operand 610 into the first high data element location of destination data item 620. A four to one data multiplexer 614 shuffles any one of data elements {H,G,F,E} from data operand 610 into the second high data element location of destination data item 620. A four to one data multiplexer 616 shuffles any one of data elements {H,G,F,E} from data operand 610 into the third high data element location of destination data item 620. A four to one data multiplexer 618 shuffles any one of data elements {H,G,F,E} from data operand 610 into the fourth high data element location of destination data item 620.

For performing a shuffle operation on the high data elements according to one embodiment of the invention, a device reads the contents of a source packed data operand 610. Any one of data elements {H,F,F,E} from the data operand 610 are shuffled into the upper half of destination data item 620. The source data operand 610 may be the same as the destination data item 620. This method of shuffling may be performed with an 8-bit control word.

Figure 6B:
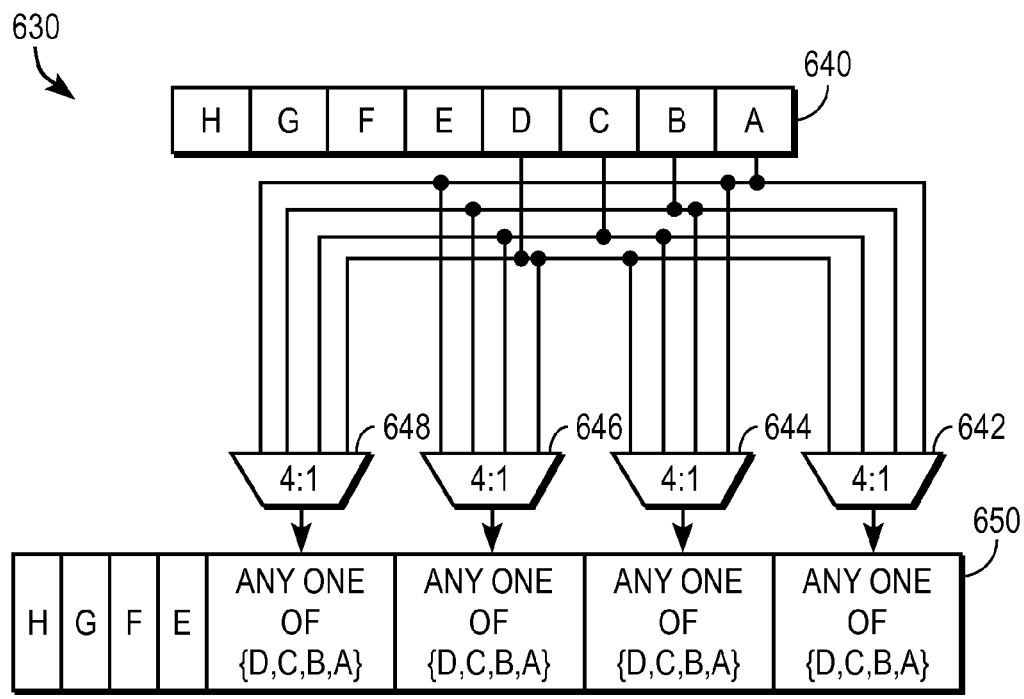

FIG. 6B illustrates a schematic for performing a shuffle operation on the low data elements according to one embodiment of the invention. The device 630 reads the contents of a source packed data operand 653. A four to one data multiplexer 642 shuffles any one of data elements {D,C,B,A} from data operand 640 into the first low data element location of destination data item 650. A four to one data multiplexer 644 shuffles any one of data elements {D,C,B,A} from data operand 640 into the second low data element location of destination data item 650. A four to one data multiplexer 646 shuffles any one of data elements {D,C,B,A} from data operand 640 into the third low data element location of destination data item 650. A four to one data multiplexer 648 shuffles any one of data elements {D,C,B,A} from data operand 640 into the fourth low data element location of destination data item 650.

For performing a shuffle operation on the low data elements according to one embodiment of the invention, a device reads the contents of a source packed data operand 640. Any one of data elements {D,C,B,A} from the data operand 653 are shuffled into the lower half of destination data item 650. The source data operand 640 may be the same as the destination data item 650. This method of shuffling may be performed with an 8-bit control word.

Figure 6C:
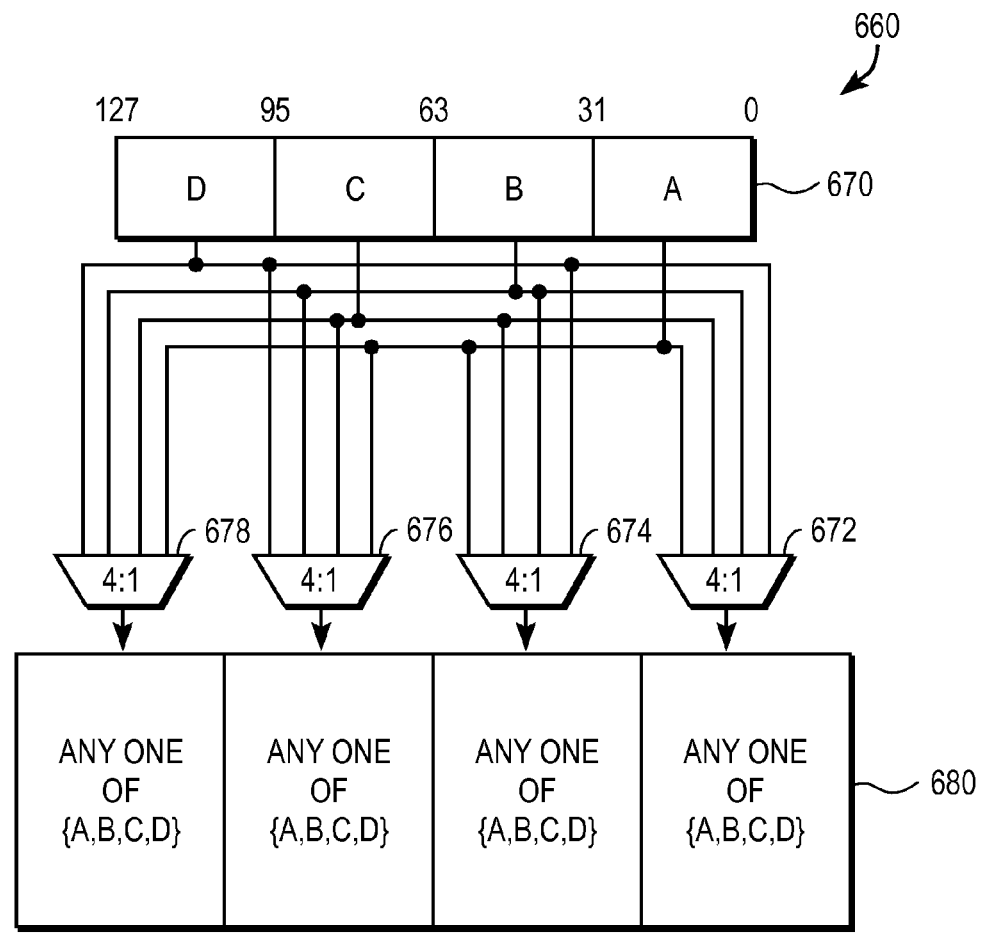

FIG. 6C illustrates a schematic for performing a shuffle operation on the four 16-bit data elements according to one embodiment of the invention. The device 660 reads the contents of a source packed data operand 670. A four to one data multiplexer 672 shuffles any one of data elements {D,C,B,A} from data operand 670 into the first low data element location of destination data item 680. A four to one data multiplexer 674 shuffles any one of data elements {D,C,B,A} from data operand 670 into the second low data element location of destination data item 680. A four to one data multiplexer 676 shuffles any one of data elements {D,C,B,A} from data operand 670 into the third low data element location of destination data item 680. A four to one data multiplexer 678 shuffles any one of data elements {D,C,B,A} from data operand 670 into the fourth low data element location of destination data item 680.

For performing a shuffle operation on the low data elements according to one embodiment of the invention, a device reads the contents of a source packed data operand 670. Any one of data elements {D,C,B,A} from the data operand 670 are shuffled into the low locations of destination data item 680. The source data operand 670 may be the same as the destination data item 680. This method of shuffling may be performed with an 8-bit control word.

Accordingly, a shuffle operation is performed. Although FIGS. 6A and 6B illustrate examples of the shuffle operation with data operands having eight data elements, the principles of the invention may also be implemented in data operands having a multiple of $2^n$ data elements. Similarly, the principles of the example shuffle operation described with reference to FIG. 6C may be implemented in data operands having four data elements.

II. Application

The shuffle instructions may be used as part of many different applications. One possible application allows flexibility to shift, rotate, or broadcast 128 bit data using a combination of the PSHUFHW, PSHUFLW, and PSHUFD instructions.

For example, a 128-bit packed data can be rotated as follows where "movdq" is a move instruction; xmm0, xmm1 and foo are data operands where foo contains 7777666655554444333322221110000; and each number represents a byte.

move data elements from foo to xmm0,
    xmm0 then contains 7777666655554444333322221110000;

pshufhw from xmm0 to xmm1 with control word [00011011],
    xmm1 then contains 4444555566667777333322221110000;

pshuflw from xmm1 to xmm2 with control word [00011011],
    xmm2 then contains 4444555566667777000011112222333;

pshufd from xmm2 to xmm2 with control word [01001110],
    xmm2 then contains 0000111122223333444455556667777.

In another example, the highest 16 bits of a 128-bit packed data can be broadcasted as follows.

move data elements from foo to xmm0, xmm0 then contains 7777666655554444333322221110000;

pshufhw from xmm0 to xmm0 with control word [11111111],
  xmm0 then contains 7777777777777773333222211110000;
pshufd from xmm0 to xmm0 with control word [11111111],
  xmm0 then contains 77777777777777777777777777777777.

In the above examples, a decoder of a processor decodes a single instruction specifying a source and destination operands, and a field of control bits. Here, the field of control bits is an 8-bit immediate value. Thereafter, an execution unit of the processor, which is responsive to the single instruction and the field of control bits, generates a first portion of the destination operand comprised of data elements from the same portion of the source operand.

Note that single instructions may be executed or emulated by dedicated hardware as well as software, or may be executed or emulated by a combination of hardware and software. For example, software routines may be used to decompose or change instructions into another instruction set. Similarly, hardware may decompose instructions into multiple micro-instructions. In either case, the resulting execution performed by the hardware and/or software is still performed in response to a single instruction.

Accordingly, a method for shuffling packed data elements includes decoding a single instruction specifying a source operand, a destination operand, and a field of control bits (e.g. 8-bit immediate value); and generating a first portion of the destination operand comprised of data elements from the same portion of the source operand, in response to the single instruction and the field of control bits. As the examples show, the portion is one of either the upper half or the lower half of the source and destination operands. Also, the source operand and the destination operand may be the same operand.

Figure 7:
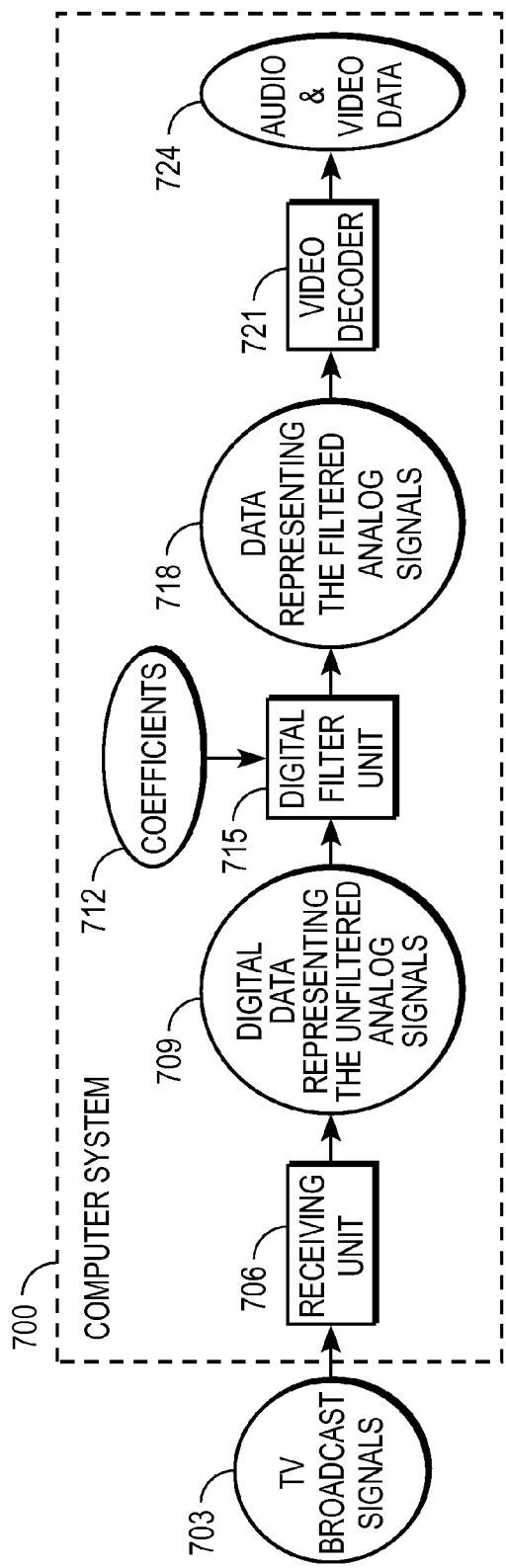
FIG. 7 is a general block diagram illustrating the usage of a digital filter which utilizes shuffle operations, for filtering a television broadcast signal in accordance with one embodiment of the invention.

FIG. 7 shows a general block diagram illustrating the use of a digital filter which utilizes a shuffle operation for filtering a TV broadcast signal according to one embodiment of the invention. FIG. 7 shows TV broadcast signals 703 representing a television broadcast being received by a receiving unit 706 of a computer system 700. The receiving unit 706 receives the TV broadcast signals 703 and transforms them into digital data 709. A digital filter unit 715 performs a digital filter (e.g., finite impulse response (FIR) and infinite impulse response (IIR)) on the digital data 709 using a set of coefficients 712. As a result, the digital filter unit 715 generates filtered data 718 (also termed as "filtered data items") representing the filtered analog TV broadcast signals. In performing the filtering operation, shuffle operations are implemented. The filtered data 718 are received by a video decoder 721 for conversion into and audio & video data 724. The techniques performed by video decoder 721 are well known (see Jack, Smith, Keith, "NTSC/PAL Digital Decoder", Video Demystified, High Text Publications, Inc., 1993). The audio and video data can be used for any purpose (e.g., display on a screen).

In one embodiment, the computer system shown 100 in FIG. 1 is used to implement the computer system 700 in FIG. 7. In this embodiment, the TV broadcast signal receiver 131 acts as the receiving unit 706 and may include a TV tuner, an analog to digital converter, and a DMA channel. The TV broadcast signals 703 are received by the TV tuner, converted into digital data by the analog to digital converter, and then sorted in the storage device 110 by the DMA channel. It will be recognized by one of ordinary skill in the art that the digital data sorted by the TV broadcast signal receiver 131 may be stored in any number of formats. For example, the TV broadcast signal receiver 131 may store the data in the main memory in one or more of the formats described herein—storing two representations of each of the components of the data such that it may be read in as packed data item in the described formats. This data may then be accessed as packed data and copied into registers on the processor 105. Since the data is stored in the disclosed formats, the processor 105 can easily and efficiently perform the shuffle operation as described with reference to FIGS. 4 and 6. It will be recognized by one of ordinary skill in the art that the receiving unit 706 may encompass additional hardware, software, and/or firmware in the TV broadcast signal receiver 131 or software executing on the processor 105. For example, additional software may be sorted in the storage device 110 for further processing the data prior to the digital filter being performed.

In this embodiment, the digital filter unit 718 is implemented using the processor 105 and the software 145 to perform the digital filter. In this embodiment, the processor 105, executing the software 145, performs the digital filter using shuffle operations, and stores the filtered data 718 in storage device 110. In this manner, the digital filter is performed by the host processor of the computer system, rather than the TV broadcast signal receiver 131. As a result, the complexity of the TV broadcast signal receiver 131 is reduced. In this embodiment, the video decoder 721 may be implemented in any number of different combinations of hardware, software, and/or firmware. The audio and video data 724 can then be sorted, and/or displayed on the display 135 and the sound unit 134, respectively.

Figure 8:
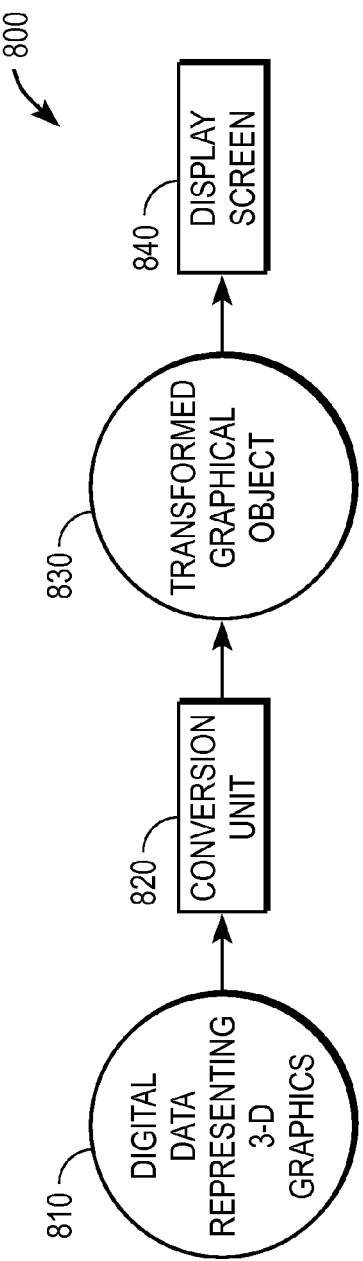
FIG. 8 is a general block diagram illustrating the use of shuffle operations, in rendering graphical objects in animation.

FIG. 8 is a general block diagram illustrating the use of a shuffle operation for rendering graphical objects in animation according to one embodiment of the invention. FIG. 8 shows a computer system 800 containing digital data 810 representing 3-dimensional (3D) graphics. The digital data 810 may be stored on a CD ROM or other type of storage device for later use. At sometime, the conversion unit 820 performs alteration of data using 3D geometry which includes the use of a shuffle operation to manipulate (e.g., scale, rotate, etc.) a 3D object in providing animation. The resulting graphical object 830 is then displayed on a screen display 840. The resulting graphical object may also be transmitted to a recording device (e.g., magnetic storage, such as tape).

In one embodiment, the computer system 100 shown in FIG. 1 is used to perform the graphics operation 800 from FIG. 7. In this embodiment, the digital data 810 from FIG. 8 is any data stored in the storage device 110 representing 3D graphics. In one embodiment, the conversion unit 820 from FIG. 8 is implemented using the processor 105 and the software 145 to alter data using 3D geometry. An example of such alteration of data includes the performance of a 3D transformation. In this embodiment, the processor 105, executing the software 145, performs the transformation and stores the transformed data 830 in the storage device 110 and/or provide, the transformed data to the graphics unit 135 of FIG. 1. In this manner, the 3D manipulation performed by the host processor of the computer system is provided at an increased speed. The present invention thus facilitates the performance of a shuffle operation through the use of available instruction sequences.

While several examples uses of shuffle operations have been described, it will be understood by one of ordinary skill in the art that the invention is not limited to these uses. In addition, the foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A computer system comprising:
a processor; and
a storage device coupled to the processor and having stored therein an instruction, which when executed by the processor, causes the processor to at least, access a packed data operand having at least two portions of data elements;
le;.5qselect a set of data elements from any data elements in a portion of the packed data operand, the portion including at least two data elements;
copy each data element of the selected set of data elements to any specified data fields located in the corresponding portion of a destination operand.

2. The computer system of claim 1, wherein the packed data operand includes eight data elements and the processor selects a set of data elements from one of either the upper half or the lower half of the packed data operand.

3. The computer system of claim 1, wherein the storage device further comprises a packing device for packing integer data into the data elements.

4. The computer system of claim 1, wherein the data elements are 16-bit data elements and wherein the data packed and destination operands are each 128-bit operands.

5. The computer system of claim 1, wherein the data packed and destination operands are the same operand.

6. A computer-implemented method comprising;
decoding a single instruction;
in response to decoding the single instruction, accessing a packed data operand including at least two portions of data elements;
selecting a set of data elements from any data elements in a portion of the packed data operand, the portion including at least two data elements;
copying each data element of the selected set of data elements to any specified data fields located in the corresponding portion of a destination operand.

7. The method of claim 6, wherein accessing a packed data operand including eight data elements and selecting a set of data elements from one of either the upper half or the lower half of the packed data operand.

8. The method of claim 6, further comprising packing integer data into the data elements.

9. The method of claim 6, wherein the data elements are 16-bit data elements and wherein the data packed and destination operands are each 128-bit operands.

10. The method of claim 6, wherein the data packed and destination operands are the same operand.

11. A computer-implemented method comprising:
accessing data representative of a first three-dimensional image;
altering the data using three-dimensional geometry to generate a second three-dimensional image, the method of altering at least including,
accessing a packed data operand having at least two portions of data elements;
selecting a set of data elements from any data elements in a portion of the packed data operand, the portion including at least two data elements;
copying each data element of the selected set of data elements to any specified data fields Located in the corresponding portion of a destination operand; and
displaying the second three-dimensional image.

12. The method of claim 11, wherein the method of altering includes the performance of a three-dimensional transformation.

13. The method of claim 11, wherein accessing a packed data operand including eight data elements and selecting a set of data elements from one of either the upper half or the lower half of the packed data operand.

14. The method of claim 11, wherein the method of altering includes packing integer data into the data elements.

15. The method of claim 11, wherein the data elements are 16-bit data elements and wherein the data packed and destination operands are each 128-bit operands.

16. The method of claim 11, wherein the data packed and destination operands are the same operand.

17. A program loaded into a computer readable medium comprising:
a computer readable code to access a packed data operand having at least two portions of data elements;
a computer readable code to select a portion of the packed data operand, the portion including at least two data elements;
a computer readable code to select a set of data elements from any data elements in the selected portion;
a computer readable code to copy each data element of the selected set of data elements to any specified data fields located in the corresponding portion of a destination operand.

18. The program of claim 17, wherein the source operand and the destination operand are the same operand.

19. The program of claim 17, wherein m=2 and the computer readable code to select a set of data elements selects one of either the upper half or the lower half of the packed data operand.

20. A processor-implemented method responsive to a single instruction, the method comprising:
accessing a source register including at least two portions of data elements;
copying each data element of a selected set of data elements from any data elements in a portion of the source register, said portion including at least two data elements, to any specified data fields located in a corresponding portion of a destination register.

21. The method of claim 20, wherein the source register of 128 bits is the same register as the destination register, and the single instruction has a control word of eight bits to specify 16-bit data fields located in the corresponding portion of the destination register.

22. A processor comprising:
a decoder to decode:
a first instruction specifying a first source operand, a first destination operand,
a second instruction specifying a second source operand, a second destination operand, and
a third instruction specifying a third source operand, a third destination operand; and
an execution unit, responsive to the first instruction, to copy each data element of a selected first set of data elements from any data elements in a first portion including at least two data elements of the first source operand to any specified data fields located in a corresponding first portion of the first destination operand; responsive to the second instruction, to copy each data element of a selected second set of data elements from any data elements in a second portion including at least two data elements of the second source operand to any specified data fields located in a corresponding second portion of the second destination operand; and responsive to the third instruction, to copy each data element of a selected third set of data elements from any data elements in a third portion including at least two data elements of the third source operand to any specified data fields located in a corresponding third portion of the third destination operand.

23. The processor of claim 22, wherein the first instruction is to copy 16-bit dam elements from the first source register of 128 bits to the first destination register of 128 bits, the second instruction is to copy data elements from the tipper half of the second source register to the upper half of the second destination register, and the third instruction is to copy data elements from the lower half of the third source register to the lower half of the third destination register.

24. The processor of claim 22, wherein the processor is comprised of either or both hardware and software components.

25. A method for shuffling packed data elements comprising:
    decoding a single instruction;
    in response to decoding the single instruction, accessing a source register having a packed data operand including at least two portions of data elements;
    selecting a set of data elements from any data elements in a portion of the packed data operand, the portion including at least two data elements; and
    copying each data element of the selected set of data elements to any specified data fields located in the corresponding portion of a destination register.

26. The method of claim 25, wherein the portion is one of either the upper half or the lower half of both the source and the destination registers.

27. The method of claim 25, wherein the data fields located in the corresponding portion of a destination register are specified by a field of control bits of the single instruction.

28. A processor comprising:
    it decoder to decode at least one single instruction; and
    an execution unit, responsive to the at least one single instruction, to copy each data element of a set of data elements from any data elements in a portion of a source register, the portion including at least two data elements, to any specified data fields located in a corresponding portion of a destination register.

29. The processor of claim 28, wherein the portion is one of either the upper half or the lower half of the source and destination registers.

30. The processor of claim 28, wherein the decoder is to decode a first instruction to shuffle 16-bit data elements from a first source register of 128 bits to a first destination register of 128 bits, a second instruction to shuffle data elements from the upper half of a second source register to the upper half of a second destination register, and a third instruction to shuffle data elements from the lower half of a third source register to the lower half of a third destination register.

* * * * *

UNITED STATES PATENT AND TRADEMARK OFFICE
CERTIFICATE OF CORRECTION

| | | |
|---|---|---|
| PATENT NO. | : 7,155,601 B2 | |
| APPLICATION NO. | : 09/783779 | |
| DATED | : December 26, 2006 | |
| INVENTOR(S) | : Chennupaty et al. | |

It is certified that error appears in the above-identified patent and that said Letters Patent is hereby corrected as shown below:

In column 11, at line 9, delete "le;.5qselect" and insert --select--.

In column 11, at line 62, delete "Located" and insert --located--.

In column 13, at line 5, delete "dam" and insert --data--.

In column 13, at line 7, delete "tipper" and insert --upper--.

In column 14, at line 6, delete "it" and insert --a--.

Signed and Sealed this

Fifteenth Day of April, 2008

JON W. DUDAS
*Director of the United States Patent and Trademark Office*